United States Patent
Horikawa et al.

(10) Patent No.: US 8,571,150 B2
(45) Date of Patent: Oct. 29, 2013

(54) FREQUENCY OFFSET COMPENSATION APPARATUS

(75) Inventors: Seiichiro Horikawa, Kawasaki (JP); Koichiro Ban, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/409,611

(22) Filed: Mar. 1, 2012

(65) Prior Publication Data

US 2012/0243646 A1 Sep. 27, 2012

(30) Foreign Application Priority Data

Mar. 25, 2011 (JP) .................................. 2011-068464

(51) Int. Cl.
*H04L 27/06* (2006.01)
(52) U.S. Cl.
USPC ........... 375/344; 375/260; 375/316; 375/324; 375/326; 375/340; 375/343; 375/354; 375/362; 375/371; 455/502; 455/516; 370/503; 370/508; 370/509; 370/510; 370/511; 370/512; 370/513; 370/514; 370/516
(58) Field of Classification Search
USPC ......... 375/260, 316, 324, 326, 340, 343, 344, 375/354, 362, 371; 455/502, 516; 370/503, 370/508, 509, 510, 511, 512, 513, 514, 516
See application file for complete search history.

(56) References Cited

U.S. PATENT DOCUMENTS 7,668,252 B2 * 2/2010 Sandell et al. ................. 375/267
8,270,545 B2 * 9/2012 Li et al. .......................... 375/344

FOREIGN PATENT DOCUMENTS

| JP | 9-8856 A | 1/1997 |
| JP | 9-246917 A | 9/1997 |
| JP | 10-65645 A | 3/1998 |
| JP | 2001-127730 A | 5/2001 |
| JP | 2001-60943 A | 6/2001 |
| JP | 3910443 B2 | 2/2007 |

OTHER PUBLICATIONS

Japanese Office Action dated Jan. 8, 2013 (and English translation thereof) in counterpart Japanese Application No. 2011-068464.

* cited by examiner

*Primary Examiner* — Leon Flores
(74) *Attorney, Agent, or Firm* — Holtz, Holtz, Goodman & Chick, PC

(57) ABSTRACT

According to one embodiment, a frequency offset compensation apparatus includes a first estimation unit, a second estimation unit, a setting unit, a synthesis unit and a compensation unit. The first estimation unit estimates a first rotation. The second estimation unit estimates a second rotation. The setting unit sets a weighting factor for the second rotation to a first value if a received power is less than a threshold value, and sets the weighting factor for the rotation to a second value being smaller than the first value if the received power is not less than the threshold value. The synthesis unit calculates a compensation value. The compensation unit compensates for a frequency offset.

8 Claims, 5 Drawing Sheets

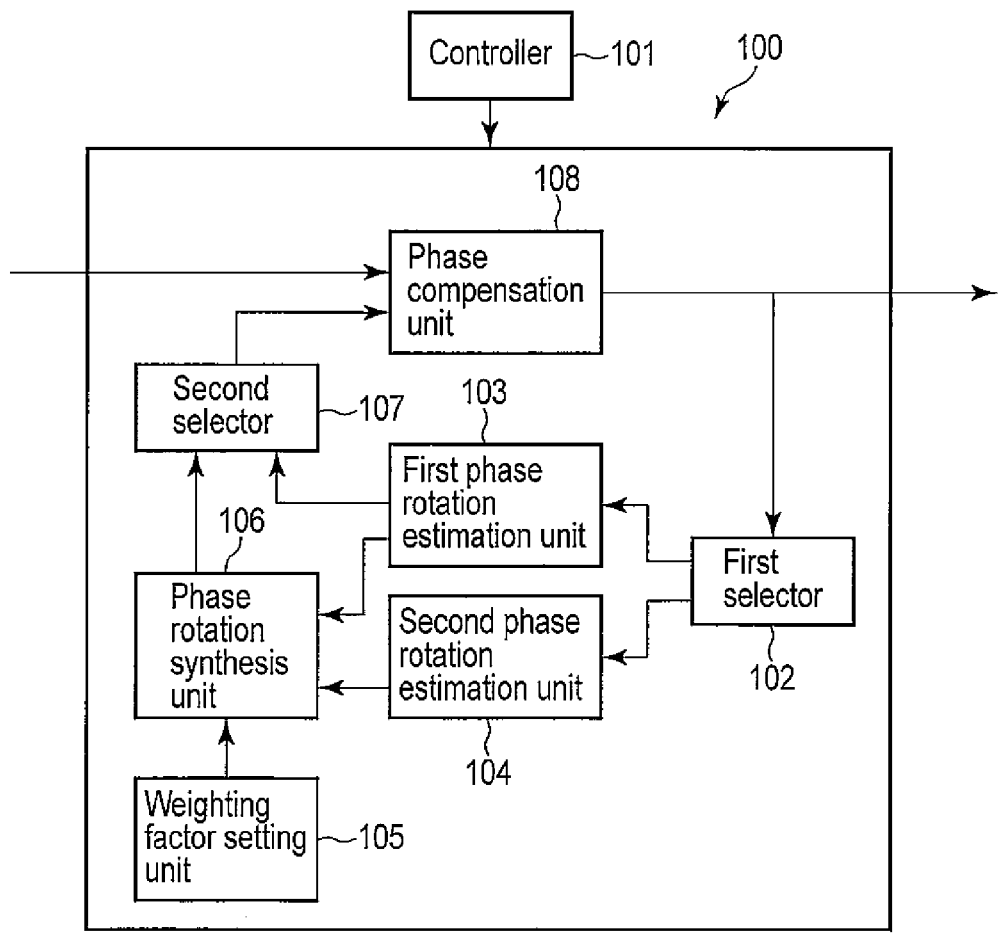
F I G. 1

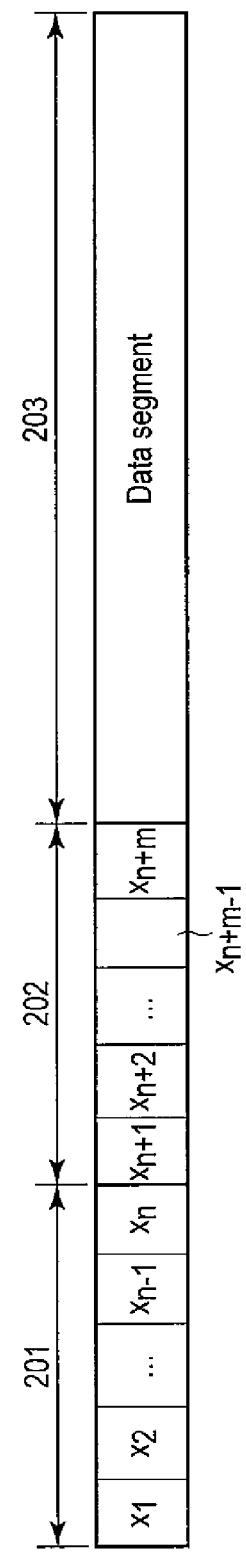
F I G. 2

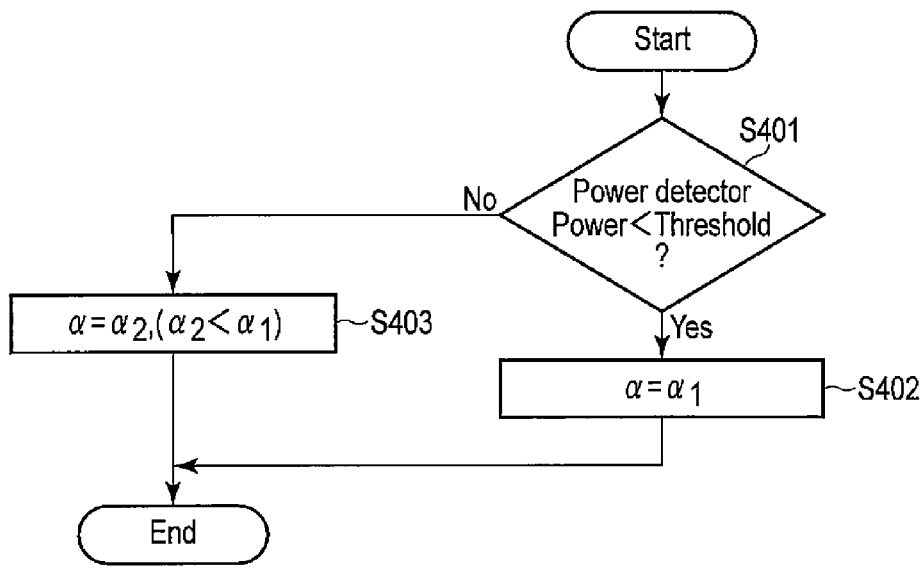
F I G. 4
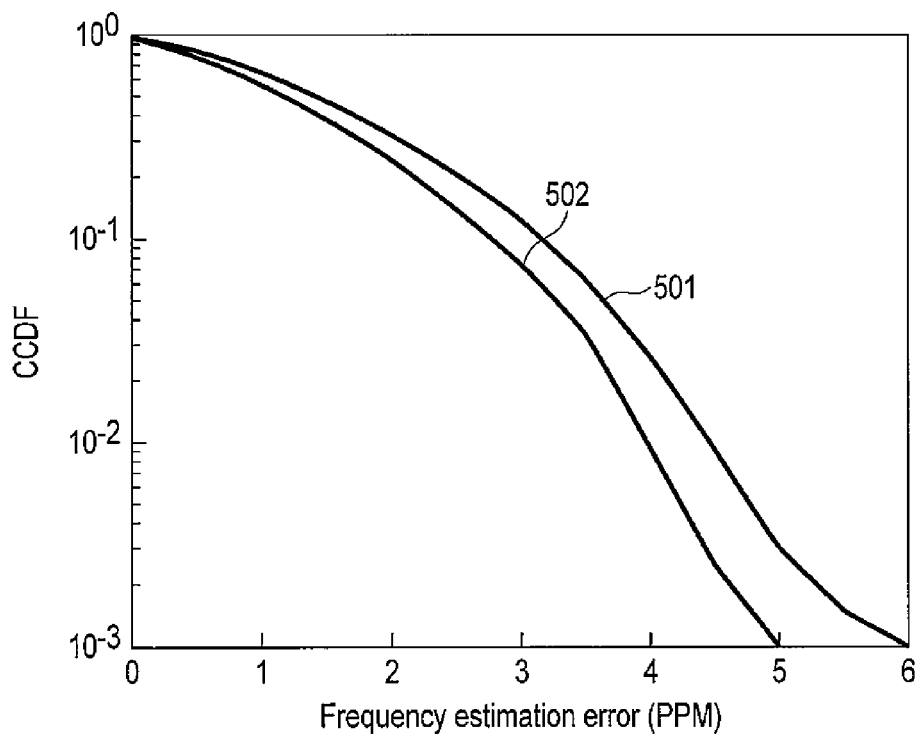
F I G. 5

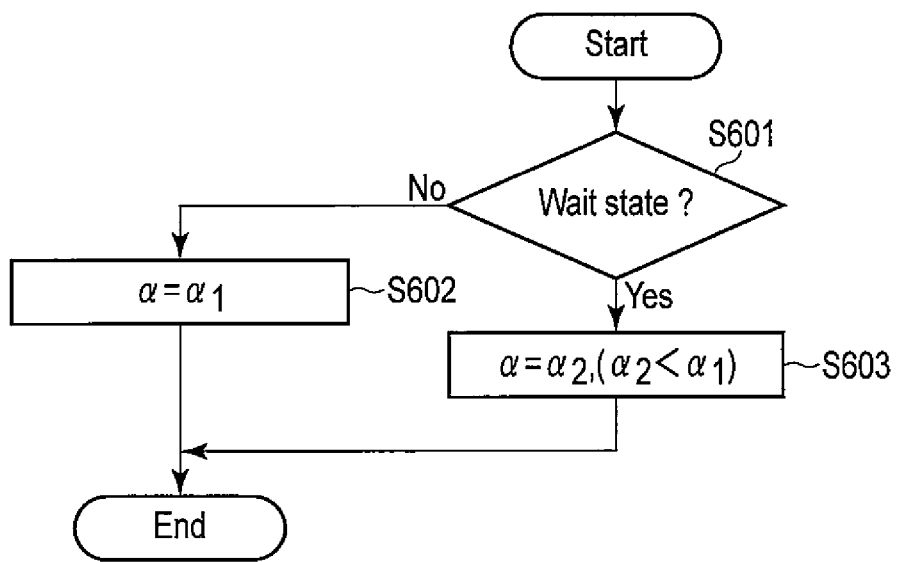
F I G. 6
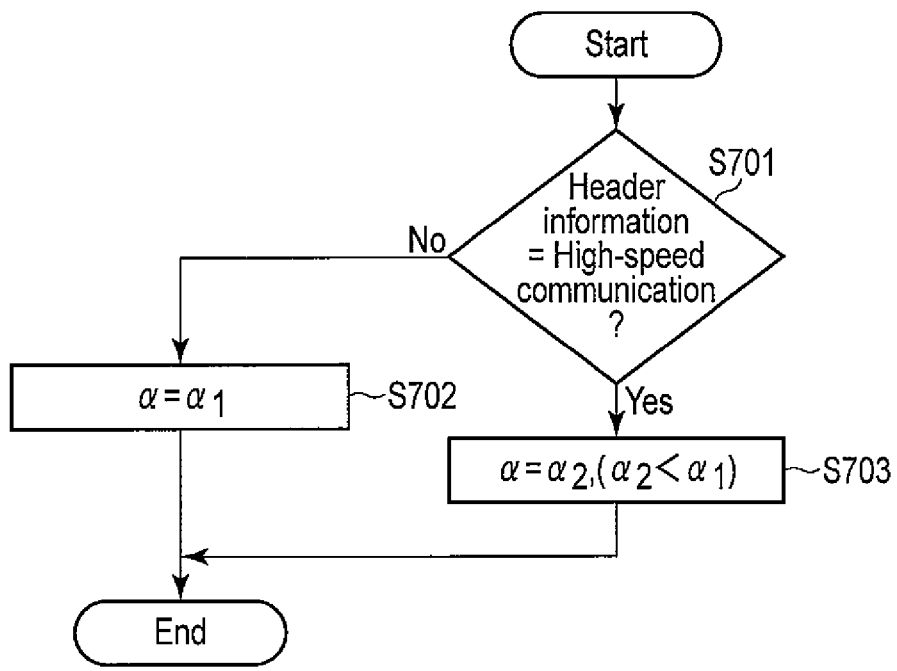
F I G. 7

FREQUENCY OFFSET COMPENSATION APPARATUS

CROSS-REFERENCE TO RELATED APPLICATIONS

This application is based upon and claims the benefit of priority from prior Japanese Patent Application No. 2011-068464, filed Mar. 25, 2011, the entire contents of which are incorporated herein by reference.

FIELD

Embodiments described herein relate generally to a frequency offset compensation apparatus.

BACKGROUND

In wireless communication, it is necessary to estimate a carrier frequency offset (hereinafter, referred to as a frequency offset) between transmission and reception and to compensate for the frequency offset when receiving a data signal. One technique for estimating and compensating for a frequency offset is to estimate the frequency offset in two steps of coarse estimation and fine estimation by using signals of known but different periods, and to compensate for the frequency offset by using the value obtained in the two steps.

BRIEF DESCRIPTION OF THE DRAWINGS

FIG. 1 is an exemplary block diagram illustrating a frequency offset compensation apparatus according to an embodiment;

FIG. 2 illustrates an example of the received signal;

FIG. 4 is an exemplary flowchart illustrating the operation of the weighting factor setting unit;

FIG. 5 illustrates an exemplary result of simulation of the frequency offset compensation apparatus;

FIG. 6 is an exemplary flowchart illustrating the operation of the weighting factor setting unit according to the first modification; and FIG. 7 is an exemplary flowchart illustrating the operation of the weighting factor setting unit according to the second modification.

DETAILED DESCRIPTION

Figure 3:
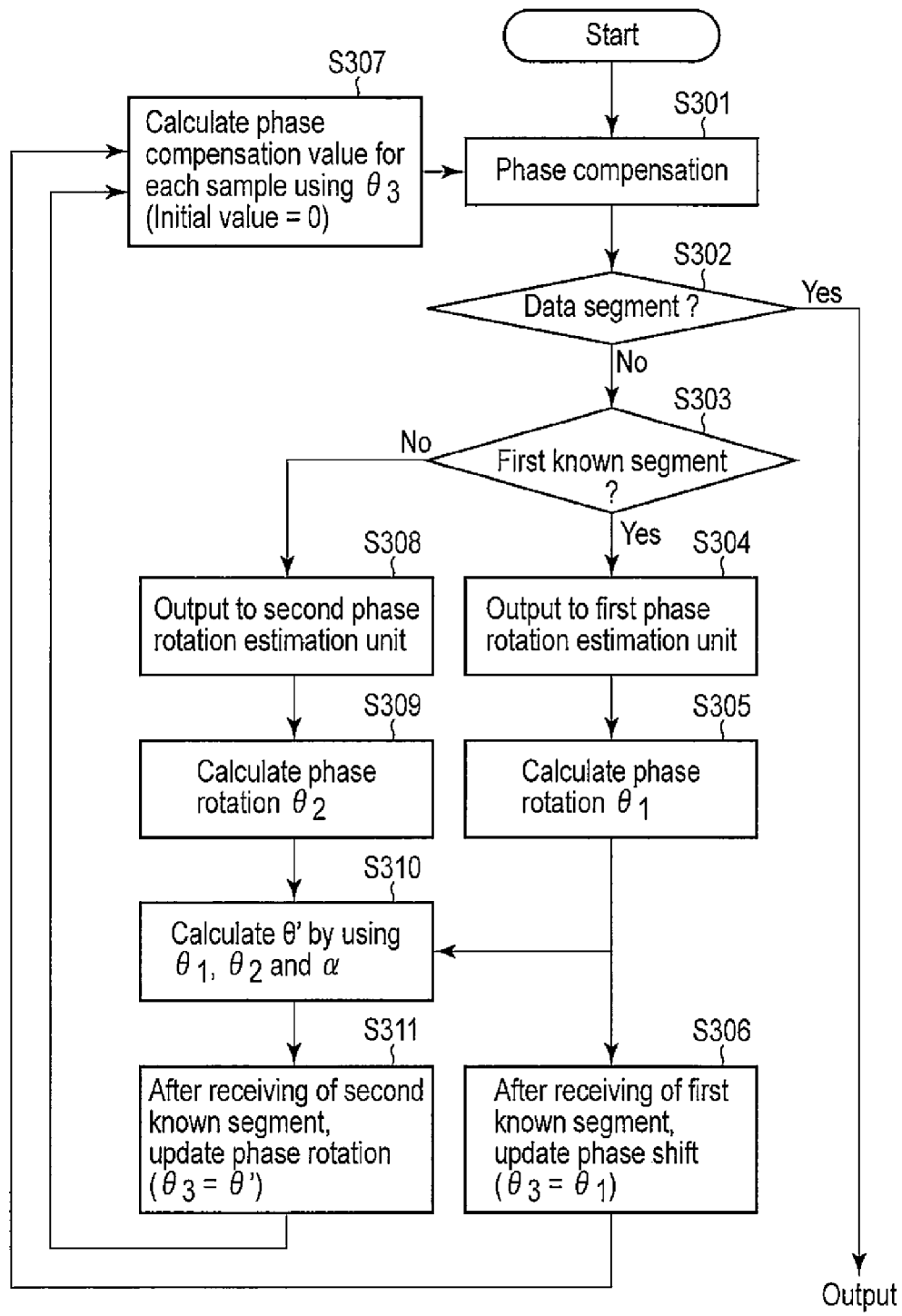
FIG. 3 is an exemplary flowchart illustrating the operation of the frequency offset compensation apparatus.

With the above-mentioned technique, the frequency offset compensation value depends solely on the fine estimation. Thus, if the accuracy of fine estimation is reduced, the frequency offset may remain, which degrades the accuracy of data communication.

In general, according to one embodiment, a frequency offset compensation apparatus in a receiver for communication with a transmitter includes a first estimation unit, a second estimation unit, a setting unit, a synthesis unit and a compensation unit. The first estimation unit is configured to estimate a first phase rotation caused by a difference between a carrier frequency of the transmitter and a carrier frequency of the receiver in a first period, by using a first known segment included in a received signal, the received signal including the first known segment and a second known segment which is longer than the first segment. The second estimation unit is configured to estimate a second phase rotation caused by a difference between a carrier frequency of the transmitter and a carrier frequency of the receiver in a second period, by using the second known segment. The setting unit is configured to set a weighting factor for the second phase rotation to a first value if a received power of the received signal is less than a threshold value, and to set the weighting factor for the second phase rotation to a second value which is smaller than the first value if the received power is greater than or equal to the threshold value. The synthesis unit is configured to calculate an offset compensation value by weighting the first phase rotation and the second phase rotation by applying the weighting factor. The compensation unit is configured to compensate for a frequency offset by using the offset compensation value.

In the following, the frequency offset compensation apparatus according to an embodiment will be described in detail with reference to the drawings. In the embodiment described below, units specified by the same reference number carry out the same operation, and may only be explained once.

A description of the frequency offset compensation apparatus according to the embodiment with reference to the block diagram of FIG. 1 follows.

The frequency offset compensation apparatus may be incorporated in a wireless receiver so that a frequency offset of a signal received from a wireless transmitter a signal can be compensated for. A semiconductor integrated circuit installed in the wireless receiver may function as the frequency offset compensation apparatus.

A frequency offset compensation apparatus 100 according to the embodiment includes a controller 101, a first selector 102, a first phase rotation estimation unit (first estimation unit) 103, a second phase rotation estimation unit (second estimation unit) 104, a weighting factor setting unit (setting unit) 105, a phase rotation synthesis unit (synthesis unit) 106, a second selector 107, and a phase compensation unit (compensation unit) 108.

The controller 101 determines whether a signal segment of an externally received signal (hereinafter, referred to as a received signal) to be processed by the frequency offset compensation apparatus 100 corresponds to a first known segment, a second known segment or a data segment. The controller 101 then controls the frequency offset compensation apparatus 100 to perform compensation in accordance with the first known segment, the second known segment or the data segment. The known segment can be any signal segment which is defined between the wireless receiver and the wireless transmitter, and may be defined by specifications.

If the first selector 102 receives the first known segment from the phase compensation unit 108 described later, the first selector 102 outputs the first known segment to the first phase rotation estimation unit 103. If the first selector 102 receives the second known segment from the phase compensation unit 108, the first selector 102 outputs the second known segment to the second phase rotation estimation unit 104.

The first phase rotation estimation unit 103 estimates a first phase rotation by using the first known segment upon receiving of the first known segment from the first selector 102. An example method for estimating the phase rotation will be described below; however, any appropriate method can be used.

The second phase rotation estimation unit 104 estimates a second phase rotation by using the second known segment upon reception of the second known segment from the first selector 102. The operation of the second phase rotation estimation unit 104 will be described below. The estimation of the phase rotation may be similar to that by the first phase rotation estimation unit 103.

The weighting factor setting unit 105 sets a weighting factor in accordance with a relative amount of phase noise generated by a synthesis unit and thermal noise such as white noise. The detailed operation of the weighting factor setting unit 105 will be described below with reference to FIG. 4.

The phase rotation synthesis unit 106 receives the first phase rotation from the first phase rotation estimation unit 103, the second phase rotation from the second phase rotation estimation unit 104, and the weighting factor from the weighting factor setting unit 105. The phase rotation synthesis unit 106 calculates an offset compensation value by applying the weighting factor to the first phase rotation and the second phase rotation.

The second selector 107 receives the first phase rotation from the first phase rotation estimation unit 103, and the offset compensation value from the phase rotation synthesis unit 106. The second selector 107 outputs the first phase rotation upon the completion of reception of the first known segment, and outputs the offset compensation value upon the completion of reception of the second known segment.

The phase compensation unit 108 externally receives a signal, and receives the first phase rotation or the offset compensation value from the second selector 107. The phase compensation unit 108 calculates a phase compensation value for each sample of the received signal by using the first phase rotation or the offset compensation value, and compensates for the frequency offset by compensating for the phase rotation of the received signal.

The signal to be input to the frequency offset compensation apparatus 100 will be explained with reference to FIG. 2 below.

As shown in FIG. 2, the signal includes a first known segment 201, followed by a second known segment 202, followed by a data segment 203. The second known segment 202 is longer than the first known segment 201. The first known segment 201 is sampled into n samples $x_1, x_2, \ldots, x_n$, where n is a natural number, and the second known segment 202 is sampled into m samples $x_{n+1}, x_{n+2}, \ldots, x_{n+m}$, where m is a natural number, and m>n. The data segment 203 includes desired payload data.

Each of the first known segment 201 and the second known segment 202 includes a certain number of repeating sub-segments. The number of samples within a repeating sub-segment of the first known segment 201 is less than or equal to that of the second known segment 202. First, a frequency offset is estimated at low precision by using the first known segment, and then a residual frequency offset is estimated at higher precision by using the second known segment. The frequency offset obtained using the first known segment represents a coarse estimate, and the residual frequency offset obtained using the second known segment represents a fine estimation.

In the embodiment, the coarse estimation is first performed by using the first known segment, and the fine estimation is performed to obtain a residual frequency offset by using the second known segment.

The operation of frequency offset compensation apparatus according to the present embodiment will be described with reference to the flowchart of FIG. 3.

In step S301, the phase compensation unit 108 performs phase compensation for each sample with the compensation value of zero.

In step S302, the controller 101 determines whether or not a data segment is being received. While receiving the data segment, the data segment is output to an output terminal of the frequency offset compensation apparatus 100, and when the data segment is not received, step S303 is executed.

In step S303, the controller 101 determines whether or not the first known segment is being received. If the first known segment is being received, step S304 is executed, and if not, step S308 is executed.

In step S304, the first selector 102 outputs the first known segment received from the phase compensation unit 108 to the first phase rotation estimation unit 103.

In step S305, the first phase rotation estimation unit 103 estimates phase rotation between samples generated by a frequency offset by using the first known segment, and calculates a first phase rotation $\theta_1$. The first phase rotation may be calculated in any appropriate way.

In step S306, the first phase rotation estimation unit 103 updates phase rotation $\theta_3$ to $\theta_1$ when reception of the first known segment is completed, or reception of the second known segment is started.

In step S307, the phase compensation unit 108 calculates a phase compensation value for each sample by using phase rotation $\theta_1$ updated in step S306.

Then, step S301 is returned to, the phase compensation unit 108 performs phase compensation for the second known segment by using the phase compensation value calculated in step S307.

In step S308, the first selector 102 outputs the second known segment received from the phase compensation unit 108 to the second phase rotation estimation unit 104.

In step S309, the second phase rotation estimation unit 104 estimates a phase rotation between samples caused by a frequency offset which is not estimated by the first phase rotation estimation unit 103 by using the second known segment, and calculates a second phase rotation $\theta_2$. Similarly to the first phase rotation, the second phase rotation may be calculated in any appropriate way.

In step S310, the phase rotation synthesis unit 106 synthesizes a weighting factor α output from the weighting factor setting unit 105, the first phase rotation $\theta_1$ and the second phase rotation $\theta_2$ to output an offset compensation value $\theta'$. The detailed methods for calculating an offset compensation value $\theta'$ and setting a weighting factor will be described later.

In step S311, phase rotation $\theta_3$ is updated to $\theta'$ when reception of the second known segment is completed, or reception of the data segment is started. In step S307, the phase compensation unit 108 calculates a phase compensation value for each sample by using $\theta'$ updated in step S311.

Then, step S301 is returned to again, and the phase compensation unit 108 performs phase compensation of the data segment by using the phase compensation value calculated in step S307. The operation of the frequency offset compensation apparatus 100 according to the present embodiment is completed.

The operations of the first phase rotation estimation unit 103 and the second phase rotation estimation unit 104 will be described. In this embodiment, a case where the number of samples within a repeating sub-segment of the first known segment is smaller than that of the second known segment, and a case where the number of samples within a repeating sub-segment is equal in the first and second known segments will be explained.

The former case will be explained first. The number of samples within a repeating sub-segment of the first known segment is represented by N, and the number of samples within a repeating sub-segment of the first known segment is represented by M, where M>N. The first phase rotation estimation unit 103 uses the first known segment whose sample number in a repeating sub-segment is smaller than the second known segment in order to broaden the frequency acquisition range. A complex number vector $Z'_K$ indicating the phase rotation of N samples is calculated by performing correlation processing between the present sample $y_K$ and the value obtained by performing complex conjugate operation relative to a sample $y_{K-N}$ received N samples before $y_K$. The complex number vector $Z'_K$ is given by $$Z'_k = y^*_{k-N} \cdot y_k \qquad (1)$$
$$= \{x_{k-N} \cdot \exp(j\omega_0(k-N))\}^* \cdot x_k \cdot \exp(j\omega_0 k)$$
$$= |x_k|^2 \cdot \exp(j\omega_0 N),\ N+1 \le k \le n.$$

In the following explanation, a noise component is ignored for simplification.

The first phase rotation estimation unit 103 performs the correlation processing while the first known segment is being received. After completion of receiving the first known segment, all complex number vectors $Z'_K$ are summed, and angle transformation is performed on the sum to obtain a phase rotation $\theta_1'$ for N samples. Phase rotation $\theta_1'$ is given by $$\theta'_1 = \mathrm{angle}\left(\sum_{k=N+1}^{n} Z'_k\right). \qquad (2)$$

Then, a phase rotation $\theta_1$ for each sample is calculated from phase rotation $\theta_1'$ for N samples by utilizing $$\theta_1 = \theta_1'/N \qquad (3)$$

The second phase rotation estimation unit 104 estimates a residual frequency offset not estimated by the first phase rotation estimation unit 103, by using the second known segment. The operation of the second phase rotation estimation unit 104 is the same as that of the first phase rotation estimation unit 103 except the sample number. The sample number for the second phase rotation estimation unit 104 is M.

Next, the case where the number of samples included in a repeating sub-segment of the first known segment is the same as that of the second known segment will be explained. The number of samples included in a repeating sub-segment of the first and second known segments is represented by N. Two methods for correlation processing will be explained below.

One of the methods is to perform correlation processing between the present sample $y_K$ and the value obtained by performing complex conjugate operation relative to a sample $y_{K-N}$ received N samples before $y_K$, as stated above, and the processing is the same as that performed by the second phase rotation estimation unit 104 although the second phase rotation estimation unit 104 performs the processing between samples which are separated from each other by an integer multiple of N.

Another method is explained below. The first phase rotation estimation unit 103 performs correlation processing between the received first known segment and the value obtained by performing complex conjugate operation relative to a first known segment $x_K$ which is prestored in the receiver. A complex number vector $Z''_K$ indicating the phase rotation of each sample of the received first known segment relative to the corresponding sample of the prestored first known segment is given by $$Z''_k = x^*_k \cdot y_k \qquad (4)$$
$$= x^*_k \cdot x_k \cdot \exp(j\omega_0 k)$$
$$= |x_k|^2 \cdot \exp(j\omega_0 k),\ 1 \le k \le n.$$

The first phase rotation estimation unit 103 performs the correlation processing while the first known segment is being received. After completion of receiving the first known segment, the first known segment is divided into a plurality of repeating sub-segments, each of which consists of N samples. Summation of all complex number vectors $Z''_K$ is performed for each repeating sub-segment, and angle transformation is performed on the sum to obtain an average phase rotation $\theta_{1q}''$ ($1 \le q \le n/N$) for each of N samples. The average phase rotation $\theta_{1q}''$ is given by $$\theta''_{1q} = \mathrm{angle}\left(\sum_{k=(q-1)N+1}^{qN} Z''_k\right),\ 1 \le q \le \frac{n}{N}. \qquad (5)$$

If the frequency offset is constant, and thermal noise is ignored, the phase rotation calculated by Equation (5) indicates simple increase (or simple decrease) represented by a linear function. Thus, the gradients of linear function $\theta_1$ which indicates the phase rotation for a sample can be calculated. The gradients may be calculated by any appropriate way.

Then, the second phase rotation estimation unit 104 performs the processing the same as the first phase rotation estimation unit 103, by using the second known segment, and calculates a phase rotation $\theta_2$ for each sample. Since the second known segment includes a larger number of samples than the first known segment, the accuracy of estimation performed by the second phase rotation estimation unit 104 is higher than that performed by the first phase rotation estimation unit 103.

The correlation processing between the known segment prepared beforehand and the received known segment was explained by using the repeating sub-segments, but can be performed without using the repeating sub-segments if all samples of the known segment are prepared beforehand.

The operation of the weighting factor setting unit 105 will be explained with reference to FIG. 4.

In the present embodiment, an output of a power detector (not shown) which detects a received power by converting a received signal into a power signal is used as an index of the relative amount of phase noise and thermal noise. The power detector may be provided as a preprocessing stage or a postprocessing stage of the frequency offset compensation apparatus 100 or provided within the frequency offset compensation apparatus 100.

In step S401, the weighting factor setting unit 105 determines whether or not an output from the power detector is less than a threshold value. If the output is less than, step S402 is executed, and if the output is greater than or equal to the threshold value, step S403 is executed. p In step S402, since it is assumed that the thermal noise has a greater effect on frequency offset than the phase noise, a relatively large weighting factor $\alpha_1$ ($\alpha_1$ being any positive number) is set to reflect the results of fine estimation performed by the second phase rotation estimation unit 104 by using the second known segment more so as to equalize the thermal noise.

In step S403, since it is assumed that the phase noise has a greater effect on frequency offset than the thermal noise, a weighting factor $\alpha_2$ which is smaller than weighting factor $\alpha_1$ set in step S402 ($\alpha_2$ being any positive number, and $\alpha_1 > \alpha_2$) is set. The phase noise including a large number of low frequency components cannot be sufficiently suppressed by the first phase rotation estimation unit 103 or the second phase rotation estimation unit 104, and the estimation accuracy is decreased. In such a case, the accuracy can be improved by performing weighted synthesis.

The operation of the phase rotation synthesis unit 106 will be explained.

The phase rotation synthesis unit 106 calculates an offset compensation value θ' by performing phase rotation synthesis by using phase rotation $\theta_1$ of the first phase rotation estimation unit, the output of second phase rotation estimation unit $\theta_2$ and the weighting factor α output from the weighting factor setting unit 105. The offset compensation value θ' is given by $$\theta' = (1-\alpha)\theta_1 + \alpha(\theta_1 + \theta_2), \quad 0 \leq \alpha \leq 1 \quad (6)$$

The equation (6) can be modified as $$\theta' = (1-\alpha)(\theta + \Delta\theta_1) + \alpha(\theta + \Delta\theta_2). \quad (7)$$

$\Delta\theta_1$ and $\Delta\theta_2$ indicate estimation errors of the first phase rotation estimation unit 103 and the second phase rotation estimation unit 104, respectively. As shown in equation (7), the estimation errors of the first phase rotation estimation unit 103 and the second phase rotation estimation unit 104 are weighted by applying the weighting factor α. Even if the estimation accuracy of fine estimate performed by the second phase rotation estimation unit 104 is degraded, the estimation accuracy for the phase compensation value is not greatly degraded by reducing the weighting for the second phase rotation.

The estimation results obtained by computer simulation will be explained with reference to FIG. 5.

FIG. 5 shows complementary cumulative distribution function (CCDF) characteristics relative to frequency estimation errors. Curve 501 indicates the results obtained by using the conventional system, and curve 502 indicates the results obtained by using the frequency offset compensation apparatus according to the present embodiment. As shown in FIG. 5, the probability that the frequency estimation error is 4 ppm or more of curve 502 is around half that of curve 501, which means that the estimation accuracy is improved for curve 502.

According to the frequency offset compensation apparatus according to the present embodiment, the phase compensation value is calculated by weighting the phase rotations obtained by the coarse estimation and the fine estimation so that error in estimation can be reduced by reducing the weighting for the phase rotation obtained by the fine estimation even if the accuracy of fine estimation is reduced.

(First Modification of Embodiment)

In the first modification of the embodiment, the weighting factor α is set at the weighting factor setting unit 105 by referring to the state of a receiver instead of the received power as an index of the relative amount of phase noise and thermal noise.

Generally, the receiver intermittently receives data in the standby state, and periodically stops each circuit to reduce power consumption. However, if the time required for restarting each circuit (start-up time) is long, the time for the stop state should be short, which impairs reduction of power consumption. In particular, since a synthesizer requires long time to lock the frequency, power consumption of the synthesizer in the standby state should be reduced more than the other circuits.

In the first modification, a phase compensation value is calculated by adjusting weighting for the coarse estimation and fine estimation to have the phase noise resistance so that demodulation of the received signal can be started before locking the frequency of the synthesizer. This reduces the start-up time for the entire system and reduces power consumption.

The operation of the weighting factor setting unit 105 according to the first modification will be explained with reference to the flowchart of FIG. 6.

In step S601, the weighting factor setting unit 105 determines whether or not the receiver is in the standby state. If the apparatus is not in the standby state, step S602 is executed, and if the apparatus is in the standby state, step S603 is executed.

In step S602, since the receiver is in the communication state, and it is assumed that the thermal noise has a greater effect on frequency offset than the phase noise, a relatively large weighting factor $\alpha_1$ is set to reflect the results of fine estimation more.

In step S603, since the apparatus is in the standby state, and it is assumed that the phase noise has a greater effect on frequency offset than the thermal noise, a weighting factor $\alpha_2$ which is smaller than weighting factor $\alpha_1$ set in step S602 is set.

According to the first modification, similarly to the embodiment, error in estimation can be reduced by adjusting weighting for the fine estimation. In addition, the weighting for the phase rotation of the fine estimation is reduced, and phase noise resistance is developed to the receiver when calculating a frequency offset compensation value, so that demodulation of the received signal can be started before locking the frequency of the synthesizer. This reduces the start-up time from the standby state and reduces power consumption in the standby state.

(Second Modification of Embodiment)

In the second modification of the embodiment, header information of a physical layer is used as an index of the relative amount of phase noise and thermal noise. If the header information indicates the state of high-speed data communication, a receiver may operate in a high signal-to-noise ratio (SNR) region, and it is assumed that the phase noise has a greater effect on frequency offset than the thermal noise.

The operation of the weighting factor setting unit 105 according to the second modification will be explained with reference to the flowchart of FIG. 7.

In step S701, the weighting factor setting unit 105 determines whether or not received data is for high-speed data communication based on header information. If the received data is not for high-speed data communication, e.g., for low-speed data communication, step S702 is executed. If the received data is for high-speed data communication, step S703 is executed.

In step S702, since it is assumed that the thermal noise has a greater effect on frequency offset than the phase noise for the low-speed communication, a relatively large weighting factor $\alpha_1$ is set to reflect the results of fine estimation more.

In step S703, since it is assumed that the phase noise has a greater effect on frequency offset than the thermal noise for the high-speed communication, a weighting factor $\alpha_2$ which is smaller than weighting factor $\alpha_1$ set in step S702 is set.

According to the second modification, similarly to the embodiment, error in estimation can be reduced by setting the weighting factor α based on the header information even if the estimation accuracy of fine estimation is reduced.

COMPARATIVE EXAMPLE

The conventional frequency offset estimation will be explained.

First, a coarse estimation to estimate a phase rotation $\theta_1$ caused by a frequency offset is performed by using a known signal whose sample number included in a repeating sub-segment is small in order to broaden the frequency acquisition range. After the coarse estimation, a fine estimation to obtain a phase rotation $\theta_2$ is performed by using a known signal whose sample number included in a repeating sub-segment is large to estimate a residual frequency offset. Then, the values obtained by the coarse estimation and the fine estimation are added, and the frequency offset is compensated for by using the added value $\theta'$. The added value $\theta'$ is given by $$\theta'=\theta_1+\theta_2. \quad (8)$$

The coarse estimation value $\theta_1$ is given by $$\theta_1=\theta+\Delta\theta_1, \quad (9)$$

and the fine estimation value $\theta_2$ is given by $$\theta_2=(\theta-\theta_1)+\Delta\theta_2, \quad (10)$$

where the phase rotation for each sample caused by the frequency offset is $\theta$.

$\Delta\theta_1$ and $\Delta\theta_2$ indicate estimation errors of the coarse estimation and the fine estimation. By adding $\theta_1$ to both sides of Equation (10) and using Equation (8), we obtain $$\theta'=\theta_1+\theta_2=\theta+\Delta\theta_2. \quad (11)$$

As shown in Equation (11), the frequency offset estimation value depends solely on the fine estimation, and if the accuracy of the fine estimation is reduced, the accuracy of frequency offset estimation will be reduced accordingly.

On the other hand, according to the present embodiment, the added value $\theta'$ obtained by weighting the values of coarse estimation and fine estimation and adding the weighted values is used for frequency offset compensation. The dependency of the fine estimation on frequency offset compensation can be decreased, and error in estimation can be reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A frequency offset compensation apparatus in a receiver for communication with a transmitter, comprising:
   a first estimation unit configured to estimate a first phase rotation caused by a difference between a carrier frequency of the transmitter and a carrier frequency of the receiver in a first period, by using a first known segment included in a received signal, wherein the received signal includes the first known segment and a second known segment which is longer than the first known segment;
   a second estimation unit configured to estimate a second phase rotation caused by a difference between a carrier frequency of the transmitter and a carrier frequency of the receiver in a second period, by using the second known segment;
   a setting unit configured to compare a received power of the received signal to a threshold value, and (i) set a weighting factor for the second phase rotation to a first value if the received power of the received signal is determined to be less than the threshold value, and (ii) set the weighting factor for the second phase rotation to a second value which is smaller than the first value if the received power is determined to be greater than or equal to the threshold value;
   a synthesis unit configured to calculate an offset compensation value by weighting the first phase rotation and the second phase rotation by applying the weighting factor; and
   a compensation unit configured to compensate for a frequency offset by using the offset compensation value.

2. The frequency offset compensation apparatus according to claim 1, further comprising:
   a first selector which outputs the first known segment included in the received signal to the first estimation unit and which outputs the second known segment included in the received signal to the second estimation unit; and
   a second selector which receives the first phase rotation from the first estimation unit and the offset compensation value from the synthesis unit,
   wherein the second selector outputs the first phase rotation upon completion of reception of the first known segment, and outputs the offset compensation value upon completion of reception of the second known segment,
   wherein the compensation unit receives the received signal and receives the first phase rotation or the offset compensation value from the second selector, and
   wherein the compensation unit calculates a phase compensation value for samples of the received signal by using the first phase rotation or the offset compensation value, and compensates for the frequency offset by compensating for phase rotation of the received signal.

3. A wireless receiver comprising the frequency offset compensation apparatus according to claim 1.

4. A frequency offset compensation apparatus in a receiver for communication with a transmitter, comprising:
   a first estimation unit configured to estimate a first phase rotation caused by a difference between a carrier frequency of the transmitter and a carrier frequency of the receiver in a first period, by using a first known segment included in a received signal, wherein the received signal includes the first known segment and a second known segment which is longer than the first known segment;
   a second estimation unit configured to estimate a second phase rotation caused by a difference between a carrier frequency of the transmitter and a carrier frequency of the receiver in a second period, by using the second known segment;
   a setting unit configured to: (i) set a weighting factor for the second phase rotation to a first value if the receiver is not in a standby state, and (ii) set the weighting factor for the second phase rotation to a second value which is smaller than the first value if the receiver is in the standby state;
   a synthesis unit configured to calculate an offset compensation value by weighting the first phase rotation and the second phase rotation by applying the weighting factor; and
   a compensation unit configured to compensate for a frequency offset by using the offset compensation value.

5. A wireless receiver comprising the frequency offset compensation apparatus according to claim 4.

6. A frequency offset compensation apparatus in a receiver for communication with a transmitter, comprising:
- a first estimation unit configured to estimate a first phase rotation caused by a difference between a carrier frequency of the transmitter and a carrier frequency of the receiver in a first period, by using a first known segment included in a received signal, wherein the received signal includes the first known segment and a second known segment which is longer than the first known segment;
- a second estimation unit configured to estimate a second phase rotation caused by a difference between a carrier frequency of the transmitter and a carrier frequency of the receiver in a second period, by using the second known segment;
- a setting unit configured to determine whether header information of a physical layer of the received signal indicates a state of relatively high-speed data communication or a state relatively low-speed data communication, and (i) set a weighting factor for the second phase rotation to a first value if the header information is determined to indicate the state of relatively low-speed data communication between the transmitter and the receiver, and (ii) set the weighting factor for the second phase rotation to a second value which is smaller than the first value if the header information is determined to indicate a state of relatively high-speed data communication between the transmitter and the receiver, wherein the high-speed data communication has a communication speed that is faster than a communication speed in the low-speed data communication;
- a synthesis unit configured to calculate an offset compensation value by weighting the first phase rotation and the second phase rotation by applying the weighting factor; and
- a compensation unit configured to compensate for a frequency offset by using the offset compensation value.

7. The frequency offset compensation apparatus according to claim 6, further comprising:
- a first selector which outputs the first known segment included in the received signal to the first estimation unit and which outputs the second known segment included in the received signal to the second estimation unit; and
- a second selector which receives the first phase rotation from the first estimation unit and the offset compensation value from the synthesis unit,
- wherein the second selector outputs the first phase rotation upon completion of reception of the first known segment, and outputs the offset compensation value upon completion of reception of the second known segment,
- wherein the compensation unit receives the received signal and receives the first phase rotation or the offset compensation value from the second selector, and
- wherein the compensation unit calculates a phase compensation value for samples of the received signal by using the first phase rotation or the offset compensation value, and compensates for the frequency offset by compensating for phase rotation of the received signal.

8. A wireless receiver comprising the frequency offset compensation apparatus according to claim 6.

* * * * *